March 11, 1924.  W. C. COX  1,486,231
PERISCOPE ATTACHMENT FOR CAMERAS
Filed June 16, 1920
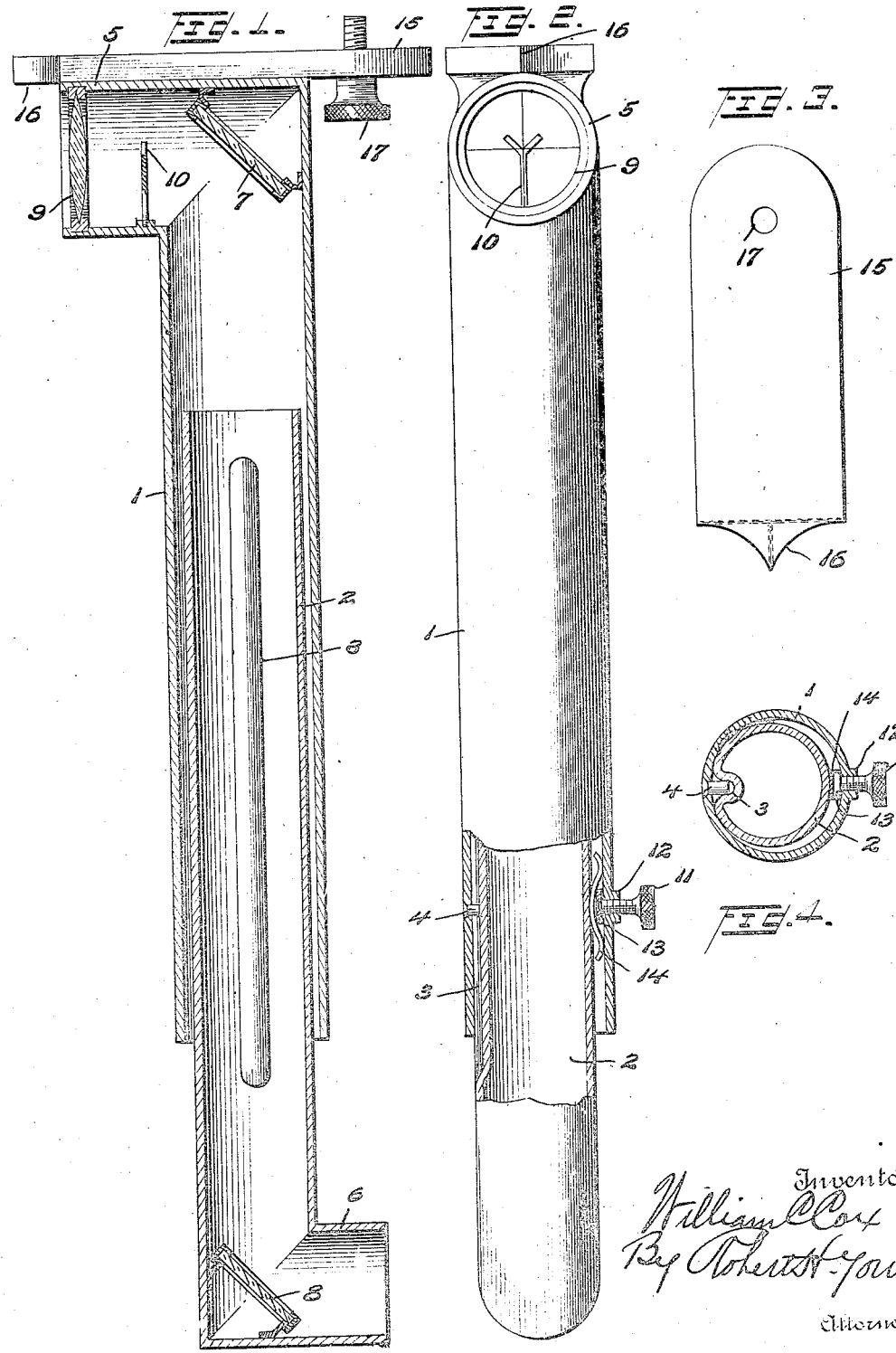

Patented Mar. 11, 1924.

1,486,231

UNITED STATES PATENT OFFICE.

WILLIAM C. COX, OF WASHINGTON, DISTRICT OF COLUMBIA.

PERISCOPE ATTACHMENT FOR CAMERAS.

Application filed June 16, 1920. Serial No. 389,514.

*To all whom it may concern:*

Be it known that I, WILLIAM C. Cox, a citizen of the United States of America, residing at Washington, in the District of Columbia, have invented a certain new and useful Improvement in Periscope Attachments for Cameras, of which the following is a specification.

This invention relates to improvements in finders for cameras and it has for its principal object to provide a periscope attachment for cameras whereby to enable a user of the same to photograph or "shoot" objects over various obstructions blocking the focusing of a clear view in the camera, such, for example, as over the walls of a trench during military operations without exposure of the photographer to enemy fire, or over the heads of persons in a crowd, where the picture to be "shot" is beyond the crowd and it becomes necessary to support the camera in a plane above such obstructions to provide the same with an unobstructed view, it, obviously, being impossible to operate such camera under those conditions in the usual manner, that is, adjacent the user's body during location and centering of the object in the camera finder.

It is also characteristic of my invention to provide an attachment for cameras which may be operatively associated therewith without alteration in any way of the camera structure and without in any way detracting from the operativeness or practicability of the camera so equipped.

Other novel features and arrangement of parts of the improved attachment or other objects sought to be accomplished thereby will be apparent from a reading of the accompanying drawings in connection with the hereinafter contained specification wherein like characters of reference are employed to designate corresponding parts throughout the several views of said drawings, and in which, Figure 1 is a vertical longitudinal section through the improved periscope attachment.

Figure 2 is a front elevation of the improved attachment having a part thereof broken away and shown in section.

Figure 3 is a plan view of the camera shelf; and

Figure 4 is a transverse section through the attachment.

Having more particular reference to the drawings, the improved periscope attachment comprises telescopic tubes 1 and 2, preferably formed of sheet metal or similar material circular in cross sections as shown in Figure 4, the inner tube being formed with a longitudinal way or groove 3 adapted to slidably receive therein a guide pin 4 on the inner side of the tube 1. The outer extremities of each of the tubes 1 and 2 are formed with tubular right angular extensions 5 and 6, disposed in opposite directions and serving as the finding and observation ends of the periscope when in use.

Mirrors 7 and 8 or other reflecting devices, are positioned in the tubes 1 and 2 adjacent the points of connection of their respective extensions 5 and 6 therewith, such mirrors, as will be noted, being arranged at angles capable of permitting reflection and projection of an object downwardly therein so that the same may be viewed from the observing end 6 of the periscope, this arrangement being usual in the production of periscopes, wherein the object located through the finder end 5 of the periscope is reflected by the mirror 7 and is thence, projected downward for reflection by the lower angularly positioned mirror 8 in order that such reflected object may be viewed from the observing end of the device.

A suitable optical lens 9 or ground glass, is arranged in the end 5, and, of course, may correspond to the ordinary camera finder. A forked sight or centering guide 10 is provided to facilitate proper location and centering of an object in the lens 9.

As means for releasably locking the telescopic tubes 1 and 2 in adjusted relation, I may, and for the purpose of illustration preferably, do employ a screw 11, threaded through a thickened portion 12 of the outer tube 1, so that the inner end of such screw, which carries a swivel head 13, will have bearing upon a curved spring 14 secured to the adjacent portion of the inner side of the tube 1. Hence, when the screw 11 is turned inwardly, it will move said spring into braking engagement with the adjacent side of the inner tube 2, whereby to prevent sliding movement of said tube with relation to the tube 1 so that the several parts will be secured in their adjusted relation.

On the upper end of the tube 1 I arrange a shelf 15 having its forward end reduced as at 16 to provide an indicator whereby when a camera is arranged on said shelf, the finder thereof can be positioned so that its focal axis will be parallel with the focal axis of the lens 9. The opposite end of the shelf 15 extends for a distance beyond the tube 1 and is formed with an opening receiving a knurled screw 17 therein which is adapted for engagement with the usual screw threaded socket formed in one wall of a camera. In this way, it will be appreciated that when a camera has been arranged on the shelf 5 and properly aligned with respect to the indicator portion 16, the knurled screw 17 may be then turned to engage the camera and retain same on the shelf 5.

If desired, the shelf 15 may be covered with a protecting material such as felt, or the like.

In using my device and assuming that a camera has been connected to the same in the manner hereinbefore outlined, the sections or tubes 1 and 2 of the periscope are adjusted in order that the camera will be supported at a height sufficient to provide the finder thereof with a clear and unobstructed view, the observing end 6 of the device being in horizontal or substantially horizontal alignment with the eyes of the user. The device may be conveniently supported by grasping the sides of the camera, with the hands of the user extended above his head. At this time, the camera may be adjusted to cause location and centering of the object to be "shot" thereby, whereupon its shutter is operated.

Manifestly, the construction shown is capable of considerable modification, and such modification as is within the scope of my claims, I consider within the spirit of my invention.

I claim:

1. In combination with a camera, a periscope, a camera supporting shelf in fixed relation to the periscope, and means for adjustably fastening the camera to said shelf, the latter having indicating means to insure setting the focal axes of the camera and periscope in parallelism.

2. In combination with a camera, a periscope, a camera supporting shelf in fixed relation to the periscope, means for adjustably securing said camera to said shelf, and means whereby said camera and said periscope may be adjusted relatively to each other to bring the focal axes thereof into parallelism.

WILLIAM C. COX.

Witnesses:
KENNETH E. MAHON,
H. C. KELLOGG.